April 18, 1933. C. D. ELLINGSTON 1,904,281
AIRCRAFT
Filed March 22, 1932 3 Sheets-Sheet 3
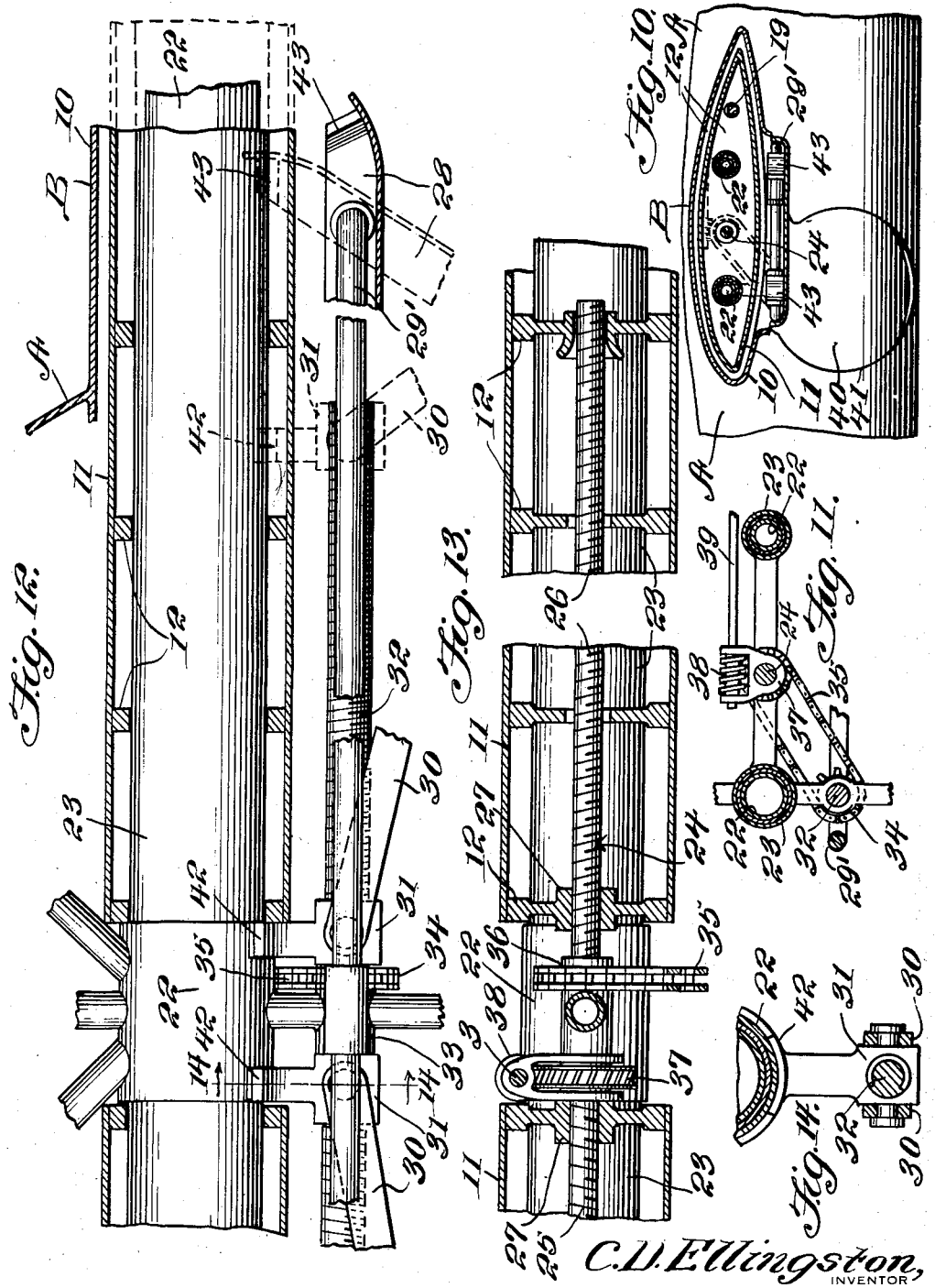
C. D. Ellingston,
INVENTOR
BY Victor J. Evans & Co.
ATTORNEY Patented Apr. 18, 1933

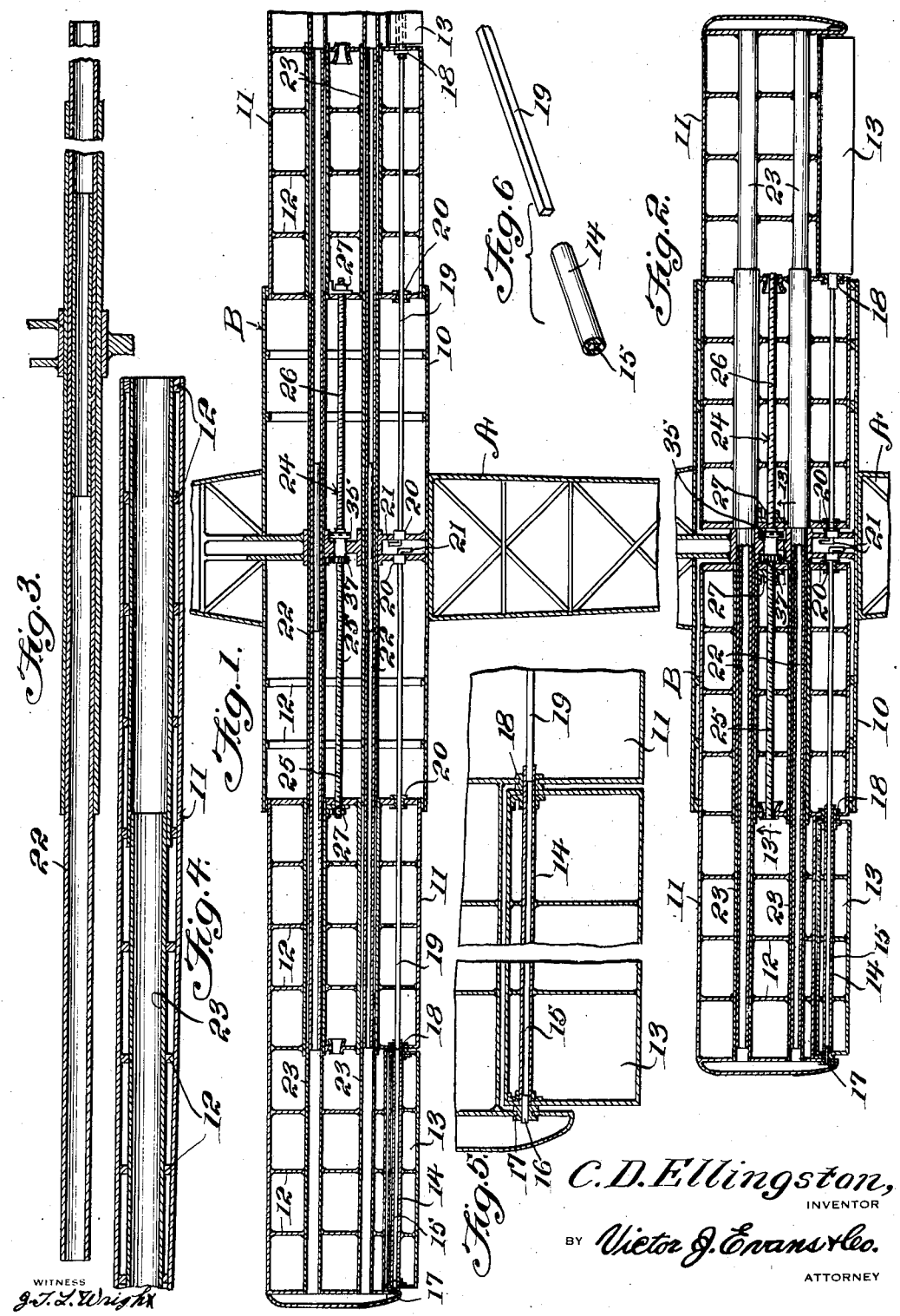

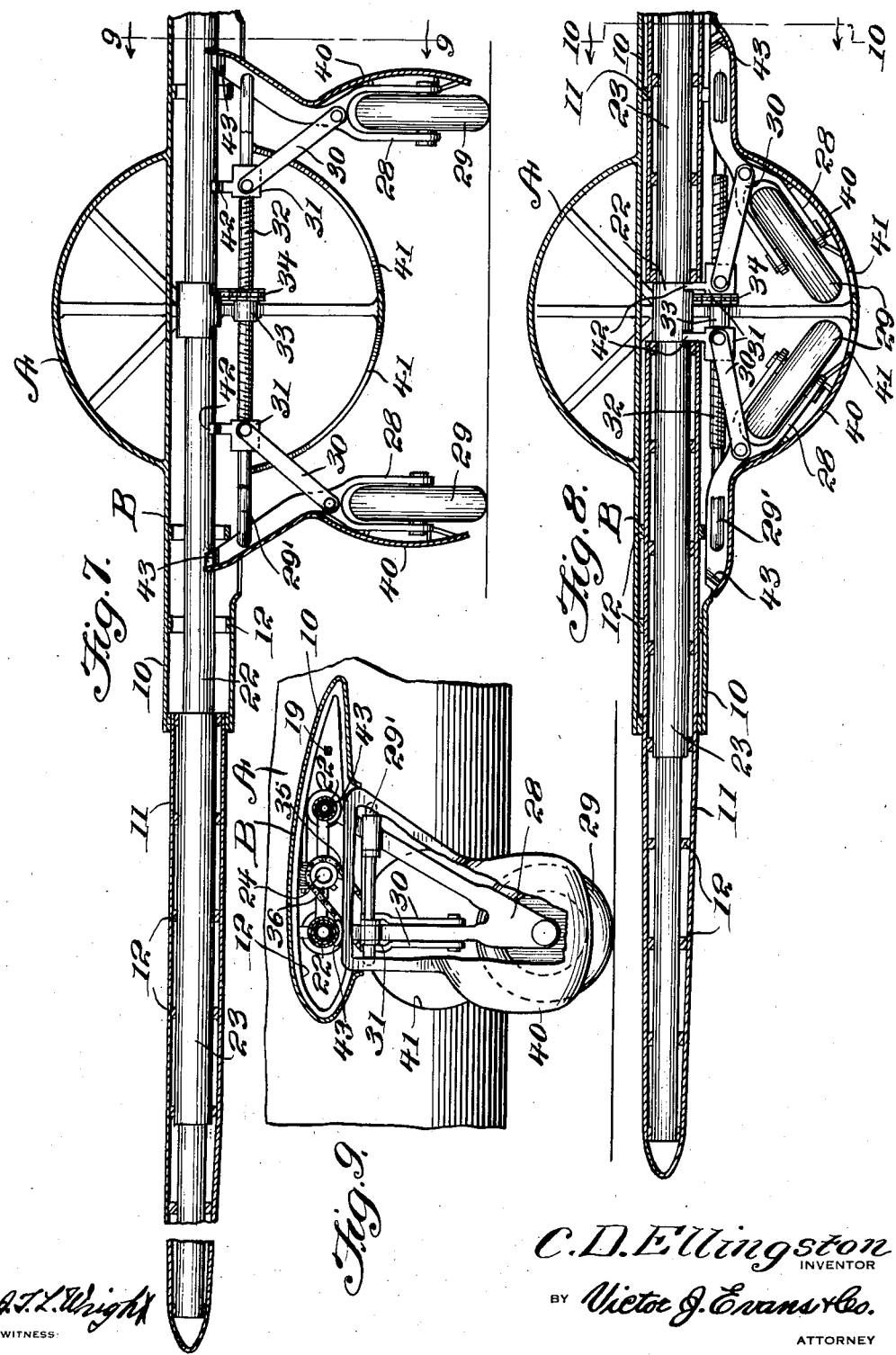

1,904,281

UNITED STATES PATENT OFFICE

CORNWALLIS D. ELLINGSTON, OF GREAT FALLS, MONTANA, ASSIGNOR OF ONE-HALF TO ALBERT E. SCHWINGEL AND WILLIAM H. BERTSCHE, OF GREAT FALLS, MONTANA

AIRCRAFT

Application filed March 22, 1932. Serial No. 600,507.

The invention relates to aircraft construction and more particularly to folding landing gear and telescopic wing construction for airplanes, preferably of the monoplane type.

The primary object of the invention is the provision of a structure of this character, wherein a quick and safe-take-off can be had by the aircraft, as the lift wing or plane thereof is susceptible of being extended to increase the lifting effect, while the landing gear can be folded after the take-off and also the wing length decreased to eliminate resistance in the flight of the airplane and enabling increased speed of travel thereof.

Another object of the invention is the provision of a structure of this character, wherein the main plane or wing is under the control of the operator of the aircraft and is susceptible of being extended or contracted to a determined degree and also the landing gear for the aircraft is of a character to permit convenient folding thereof, the latter being automatically adjusted to assure greater safety in take-off and landing, the plane or wing being telescopically assembled and in adjustment thereof increases the lifting power for an easy and quick take-off and landing and also for regulating the speed of flight of the aircraft, the wing or plane being reduced to the minimum when the said aircraft is in flight and thereby reducing or minimizing wind resistance.

A further object of the invention is the provision of a structure of this character, wherein the landing gear and the wing or plane are of novel form and likewise novel in assembly so as to give strength to the aircraft and also to assure safety in a take-off or landing thereof and the effecting of the latter with dispatch.

A still further object of the invention is the provision of a structure of this character which is comparatively simple in its make-up, thoroughly reliable and efficient in its purposes, strong, durable, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 1 is a fragmentary horizontal sectional view through the main wing or plane and the fuselage of an aircraft, showing the structure in accordance with the invention and the main wing extended for a take-off or landing.

Figure 2 is a view similar to Figure 1 showing the main wing or plane contracted, this being its position when the aircraft is in flight.

Figure 3 is a fragmentary vertical sectional view through the telescopic connectors of the main wing or plane sections.

Figure 4 is a view similar to Figure 3 through the wing sections.

Figure 5 is an enlarged fragmentary sectional view through one aileron.

Figure 6 is a perspective view of the pivotal mounting of the aileron, the parts being separated.

Figure 7 is a vertical transverse sectional view through the aircraft showing the main wing or plane extended and the landing gear adjusted for use.

Figure 8 is a view similar to Figure 7 showing the wing contracted and the landing gear folded.

Figure 9 is a sectional view on the line 9—9 of Figure 7 looking in the direction of the arrows.

Figure 10 is a sectional view on the line 10—10 of Figure 8 looking in the direction of the arrows.

Figure 11 is a detail sectional view through the control gearing.

Figure 12 is an enlarged vertical transverse sectional view showing by full lines the position of adjuncts of the landing gear when folded and by dotted lines the extended or using position of said gear.

Figure 13 is a mutilated sectional view on the line 13—13 of Figure 2.

Figure 14 is a sectional view on the line

14—14 of Figure 12 looking in the direction of the arrows.

Similar reference characters indicate corresponding parts throughout the several views in the drawings.

Referring to the drawings in detail, A designates generally a portion of the fuselage of an aircraft, which may be of streamline formation and of any standard construction having in association therewith a main plane or wing B including an intermediate or stationary section 10 and the outer movable or telescopic sections 11, these being constructed so that the sections 11 will telescopically move into the section 10 or be projected therefrom. The sections 10 and 11 each has formed interiorly thereof the ribs 12 which give reinforcement and strength thereto.

The outer sections 11 of the plane or wing each has formed at its heel edge a swinging aileron 13 which has therein a pivot sleeve 14, the latter being formed with a squared central bore 15 and this sleeve has the pintle 16 journaled in a bearing 17 in said section 11 while the opposite end of the sleeve 14 is journaled in the bearing 18 and telescopically engaged in the bore 15 is a squared operating rod 19 journaled at 20 in the section 10 and carries an actuator crank 21 so that the aileron 13 can be vertically swung and at the same time the section 11 carrying it can be telescopically adjusted relative to the section 10 of the main plane or wing. The cranks 21 are associated with suitable controls (not shown) within the fuselage A.

Suitably carried within the sections 10 and 11 are the interfitted inner and outer telescopic fittings 22 and 23 respectively, these being arranged transversely of the fuselage and longitudinally of the plane or wing in its entirety, the fittings being of a character to give maximum strength to the plane or wing when extended or contracted.

Mounted in the section 10 of the plane or wing is a feed screw 24 having the reversely threaded portions 25 and 26 respectively engaging nuts 27 as secured to the inner ends of the sections 11 so that by the turning of the screw 24 the said sections 11 can be extended or retracted from and into the section B, thus increasing or decreasing the extent of the plane or wing.

Related with the fuselage A is a folding landing gear comprising a pair of wheeled forks 28, these being of any approved form and have journaled therein the ground wheels 29, the forks being swingingly suspended from hangers 29' and are disposed directly opposite each other and at opposite sides of the fuselage. Each fork 28 through the medium of links 30 has connection with a feed nut 31 engaged on a feed screw 32 journaled at 33 in the fuselage A. The screw 32 carries a sprocket wheel 34 over which is trained endless sprocket chains 35, the same being trained over a sprocket wheel 36 on the screw 24 so that both screws 32 and 24 will operate together, the threads of these screws being of proper pitch to impart the required adjustment. The screw 24 carries a worm gear 37 meshing with the worm pinion 38 on a driver shaft 39 controlled from within the fuselage for the folding and unfolding of the landing gear and the contracting or extending of the plane or wing.

The forks 28 carry outer guards 40, these forming closures for entrances 41 provided in the body of the fuselage A for the landing gear, the details of this particular feature being shown in Figures 7, 8, 9 and 10 of the drawings. The forks 28 when in folded position are concealed within the fuselage A and the entrances 41 shut by the guards 40. The nut 31 carries saddles 42 to partially embrace the inner fitting 22 and likewise the forks have saddles 43 for such fitting so that when the landing gear is extended for use the same can withstand strain and shock.

It is of course understood that in the use of the aircraft involving the telescopic plane or wing and the foldable landing gear when a take-off or landing is to be made thereby the wing or plane is extended to its maximum and likewise the landing gear is adjusted for the unfolding thereof for use but when the aircraft is in flight the landing gear is folded and likewise the plane or wing contracted so as to minimize wind resistance and thus enable speed in flight to be had.

From the foregoing it is thought that the construction and manner of operation of the structure will be clearly understood and therefore a more extended explanation has been omitted.

Furthermore it is contemplated that changes, variations and modifications may be made in the invention such as come within the scope of the appended claims without departing from the spirit of the invention or sacrificing any of its advantages.

What is claimed is:—

1. In an aircraft, a fuselage, a main plane thereon having a stationary intermediate section and outer movable sections, feed screws rotatably supported in the fuselage transversely thereof and having reversely threaded end portions, telescopic fittings arranged in the intermediate and outer sections of the main plane, nuts fixed to the outer sections at their inner ends and threaded on the end portions of one feed screw, hangers carried at opposite sides of the fuselage below the intermediate section, wheel forks hinged to said hangers, ground wheels journaled in said wheel forks, feed nuts threaded on the end portions of the other feed screw, link connections between the last mentioned feed nuts and the forks, and connections between the feed screws for simultaneous operation thereof.

2. In an aircraft, a fuselage, a main plane thereon having a stationary intermediate section and outer movable sections, feed screws rotatably supported in the fuselage transversely thereof and having reversely threaded end portions, telescopic fittings arranged in the intermediate and outer sections of the main plane, nuts fixed to the outer sections at their inner ends and threaded on the end portions of one feed screw, hangers carried at opposite sides of the fuselage below the intermediate section, wheel forks hinged to said hangers, ground wheels journaled in said wheel forks, feed nuts threaded on the end portions of the other feed screw, link connections between the last mentioned feed nuts and the forks, connections between the feed screws for simultaneous operation thereof, said fuselage having openings in opposite sides thereof for accommodating the wheel forks when moved inwardly, and guards carried by the wheel forks and constituting closures for the said openings in the fuselage when the forks move inwardly.

3. In an aircraft, a fuselage, a main plane thereon havng a stationary intermediate section and outer movable sections, feed screws rotatably supported in the fuselage transversely thereof and having reversely threaded end portions, telescopic fittings arranged in the intermediate and outer sections of the main plane, nuts fixed to the outer sections at their inner ends and threaded on the end portions of one feed screw, hangers carried at opposite sides of the fuselage below the intermediate section, wheel forks hinged to said hangers, ground wheels journaled in said wheel forks, feed nuts threaded on the end portions of the other feed screw, link connections between the last mentioned feed nuts and the forks, connections between the feed screws for simultaneous operation thereof, said fuselage having openings in opposite sides thereof for accommodating the wheel forks when moved inwardly, guards carried by the wheel forks and constituting closures for the said openings in the fuselage when the forks move inwardly, and ailerons carried at the heel edges of the outer sections of the main plane and movable into the intermediate section on the inward shifting of the said outer sections relative thereto.

In testimony whereof I affix my signature.

CORNWALLIS D. ELLINGSTON.